E. ANDERSON.
FORK.
APPLICATION FILED AUG. 3, 1916.
1,213,446.
Patented Jan. 23, 1917.
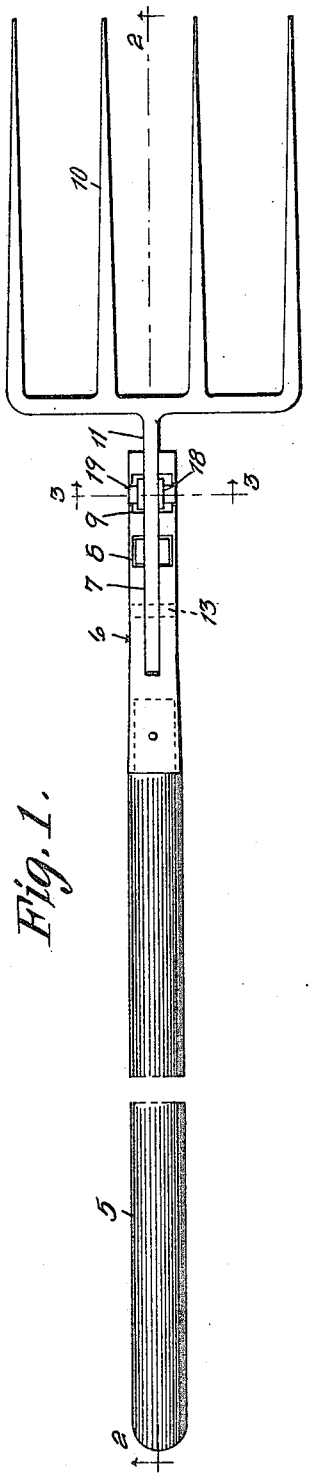
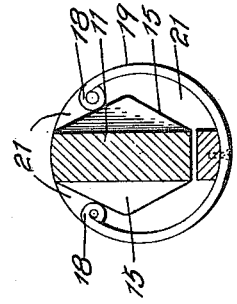
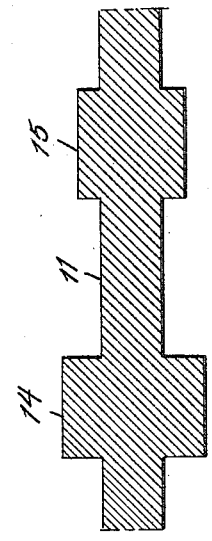
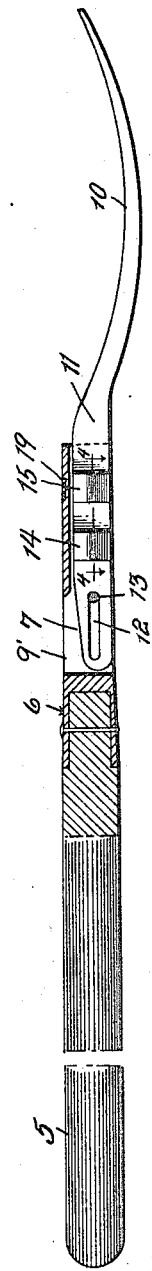
Inventor
Elmer Anderson.
By C. L. Parker, Attorney

UNITED STATES PATENT OFFICE.

ELMER ANDERSON, OF PALMYRA TOWNSHIP, RENVILLE COUNTY, MINNESOTA.

FORK.

1,213,446.  Specification of Letters Patent.  Patented Jan. 23, 1917.

Application filed August 3, 1916. Serial No. 112,996.

*To all whom it may concern:*

Be it known that I, ELMER ANDERSON, a citizen of the United States, residing in Palmyra township, in the county of Renville and State of Minnesota, have invented certain new and useful Improvements in Forks, of which the following is a specification.

My invention relates to improvements in pitch-forks or the like, and has particular reference to means for connecting the fork or ground treating implement with the handle, so that such connection will yield or break when an excessive load is placed upon the fork, thus relieving the device of undue strains and preventing injury thereto.

An important object of the invention is to provide a device of the above mentioned character, which is simple in construction, strong, durable, and highly convenient in use.

Other objects and advantages of the invention will be apparent during the course of the following description.

In the accompanying drawings forming a part of this specification and in which like numerals are employed to designate like parts throughout the same, Figure 1 is a plan view of a device embodying the invention, Fig. 2 is a longitudinal sectional view taken on line 2—2 of Fig. 1, Fig. 3 is a transverse sectional view taken on line 3—3 of Fig. 1, and, Fig. 4 is a detail horizontal section taken on line 4—4 of Fig. 2.

In the drawings, wherein for the purpose of illustration is shown a preferred embodiment of my invention, the numeral 5 designates a handle, carrying a shank 6, rigidly secured thereto by any suitable means. This shank is provided with a longitudinally extending surface groove 7, having recesses 8 and 9, and an opening 9', as shown.

The numeral 10 designates an implement, such as a pitch-fork, provided with a shank 11. This shank extends into the longitudinal groove 7 and is provided near its inner end with a longitudinal slot 12. This slot receives a transverse pin or pivot element 13, secured to the shank 6. From the foregoing description it is obvious that the implement shank 11 may be swung upon its pivot 13 and moved longitudinally with respect to the handle shank 6.

Rigidly secured to the shank 11 and preferably formed integral therewith are cams or members having inclined faces 14 and 15, the inner cam 14 having the greater width. The cams 14 and 15 are adapted to contact with preferably rolled ends 18 of a curved spring 19. This curved spring straddles the forward end portion of the handle shank 6 and is attached thereto, as shown at 20, in proximity to the recess 9. The recess 9 is in communication with openings or notches 21, receiving the ends of the spring 19.

In operation, when the shank 11 is in the inner longitudinal position with respect to the handle shank 6, the ends of the spring 19 contact with the cam 15. It is thus apparent that the spring 19 will normally retain the shank 11 within the groove 7 and prevent its lateral movement with respect to the handle shank 6. When the fork 10 engages the work to be raised and pressure is applied thereto, in excess, the tension of the spring 19 is overcome and the joint will break or yield, the shank 11 swinging downwardly or in the direction of the arrow, as shown in Fig. 2.

When the fork 11 is in the lateral outer position, it may be moved forwardly longitudinally and the cam 14 moved into the recess 9, while the cam 15 is arranged beyond the forward end of the shank 6, the spring 19 engaging the cam 14. As this cam 14 is thicker than the cam 15, the spring 19 will be placed under greater tension, and an increased pressure is necessary to yield or break the connection between the fork or implement and handle. It is thus apparent that the connecting means is adjustable for enabling the device to raise different loads.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A device of the character described, comprising a handle having a shank provided with a longitudinal opening and a recess in communication with the longitudinal opening, an implement having a shank longitudinally adjustably mounted within the longitudinal opening and provided with an enlarged member for insertion within the recess to lock the implement shank against longitudinal movement with relation to the handle shank, and yielding means adapted to oppose the lateral movement of the implement shank with relation to the handle shank.

2. A device of the character described, comprising a handle having a shank provided with a longitudinal opening and a plurality of recesses leading into the longitudinal opening, an implement having a shank longitudinally adjustably mounted within the longitudinal opening and provided with a plurality of cams adapted for insertion within the recesses, and a laterally extending spring secured to the handle shank and adapted to contact with a selected cam.

3. A device of the character described, comprising a handle having a shank provided with a longitudinal opening and a plurality of recesses leading into the longitudinal opening, an implement having a shank longitudinally adjustably mounted within the longitudinal opening and having a longitudinal slot formed therein and a plurality of cams adapted for insertion within the recesses, a pin secured to the handle shank and passing through the slot of the implement shank, and a substantially U-shaped spring straddling the handle shank and secured thereto and adapted to contact with a selected cam.

In testimony whereof I affix my signature in presence of two witnesses.

ELMER ANDERSON.

Witnesses:
FRANK HOPKINS,
GLADYS HOPKINS.

Copies of this patent may be obtained for five cents each, by addressing the "Commissioner of Patents, Washington, D. C."